J. C. BARBER.
ANTIFRICTION CENTER BEARING FOR CARS.
APPLICATION FILED JUNE 11, 1906.

901,223.

Patented Oct. 13, 1908.

Witnesses.
E. W. Jeppson,
H. O. Kilgore

Inventor.
John C. Barber.
By his Attorneys,
Williamson & Merchant

UNITED STATES PATENT OFFICE.

JOHN C. BARBER, OF CHICAGO, ILLINOIS.

ANTIFRICTION CENTER BEARING FOR CARS.

No. 901,223.

Specification of Letters Patent.

Patented Oct. 13, 1908.

Application filed June 11, 1906. Serial No. 321,154.

*To all whom it may concern:*

Be it known that I, JOHN C. BARBER, a citizen of the United States, residing at Chicago, in the county of Cook and State of Illinois, have invented certain new and useful Improvements in Antifriction Center Bearings for Cars; and I do hereby declare the following to be a full, clear, and exact description of the invention, such as will enable others skilled in the art to which it appertains to make and use the same.

My present invention has for its especial object to provide an improved anti-friction center bearing for cars, and to this end it consists of the novel devices and combinations of devices hereinafter described and defined in the claim.

The improved center bearing is illustrated in the accompanying drawings, wherein like characters indicate like parts throughout the several views.

Figure 1:
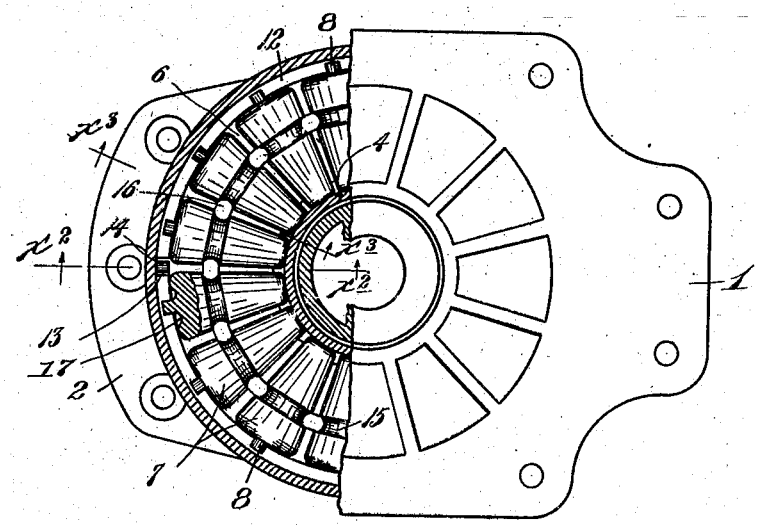
Figure 2:
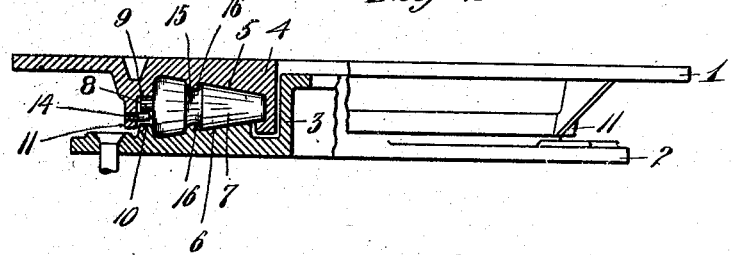
Figure 3:
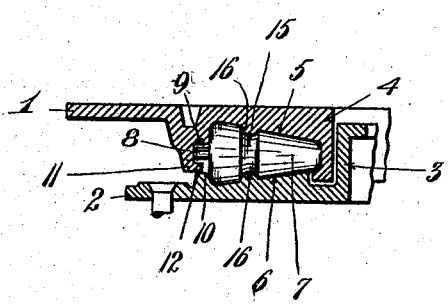

Referring to the drawings, Figure 1 is a plan view, with some parts broken away and some parts sectioned, showing the improved center bearing. Fig. 2 is a view partly in elevation and partly in vertical section, taken on the line $x^2$ $x^2$ of Fig. 1, and Fig. 3 is a section taken on the line $x^3$ $x^3$ of Fig. 1.

The numeral 1 indicates the upper member, and the numeral 2 the lower member of the center bearing, the former of which is adapted to be bolted or otherwise secured to the body bolster of a car, and the latter of which is adapted to be bolted or otherwise secured to an underlying truck bolster. The lower member 2 is provided with an upwardly projecting central hub or sleeve portion 3, and the upper member 1 is provided with a depending sleeve portion 4 that surrounds the said hub 3. The upper bearing member 1 is provided, outward of its sleeve 4, with a conical annular roller bearing surface 5; and the lower member 2 is provided with a conical annular roller bearing surface 6 that directly underlies the said bearing surface 5. The conical bearing surfaces 5 and 6 flare or diverge from each other in an outwardly direction. Truncated conical bearing rollers 7 are interposed between the conical bearing surfaces 5 and 6. The small inner ends of the said rollers fit in annular grooves cut on the outer face of the depending sleeve portion 4 of the upper member 1. At their large outer ends, said rollers are provided with small trunnions 8 which, when the rollers are in working positions, lie under an annular shoulder 9 formed at the outer extremity of the conical seat 5.

The lower bearing member 2, at the outer extremity of its conical bearing surface 6, has a slightly raised, roller engaged stop rib 10, and the upper member is provided with a depending annular flange 11 that is located just outward of the trunnions 8, and slightly overlaps said stop rib 10. The depending flange 11 is formed with an inwardly projecting annular retaining rib 12 that directly underlies all of the trunnions 8 of the rollers 7. This retaining rib 12 is provided with an entrance notch 13 (see Fig. 1) that is of such size that it will permit the trunnions 8 of the rollers to be passed laterally therethrough. This entrance passage 13 is normally closed by a lock pin or stud 14 that is driven or screwed through the depending flange 11 (see Figs. 1 and 2). The retaining rib 12 and the lock pin 14 lie in the same horizontal plane and, when said pin is in working position, it is impossible to remove the rollers 7 from working position with respect to the bearing member 1, inasmuch as the trunnions 8 are supported by the retaining flange 12, and the inner ends of said rollers are supported by the groove in the depending sleeve portion 4. When the lock pin 14 is removed, the rollers may be moved, one at a time, in such positions that their studs 8 will aline with and may be passed laterally downward through the notch 13.

To prevent the conical rollers from sliding endwise on the conical bearing surfaces 5 and 6, the said rollers are provided, at their intermediate portions, with peripheral grooves 15, and the bearing surfaces 5 and 6 are provided with annular thrust ribs 16 that engage in the said grooves 15. Of course, the construction might be the reverse. That is, the rollers might be provided with projecting peripheral ribs, and the bearing surfaces 5 and 6 might be provided with coöperating annular grooves. The large ends of the rollers 7 also may bear against the so-called retaining flange 12, and to prevent contact between the entire ends of the said rollers, they are formed with annular concavities 17, immediately surrounding their trunnions 8 and inward of their peripheral portions. This construction provided for contact between the flange 12 and the outer portions of the large ends of the said bearing rollers, and greatly assists in keeping the rollers in true radial arrangement; that is, with their axes all intersecting the axes of the center bearing.

The device above described, while simple, strong and durable, is generally efficient for the purposes had in view.

What I claim is:

The combination with upper and lower members of a center bearing, said members having telescoping hub flanges and concentric outer roller retaining flanges, of conical rollers interposed between the conical bearing surfaces of said two members and interlocked with one of said bearing members but free to rotate and travel in respect to both of said bearing members, substantially as described.

In testimony whereof I affix my signature in presence of two witnesses.

JOHN C. BARBER.

Witnesses:
L. W. BARBER,
E. W. WEBB.